United States Patent [19]

Takeuchi et al.

[11] Patent Number: 5,516,340
[45] Date of Patent: May 14, 1996

[54] PROCESS FOR MAKING A METAL OXIDE COMPOSITE CATHODE MATERIAL FOR HIGH ENERGY DENSITY BATTERIES

[75] Inventors: Esther S. Takeuchi, East Amherst; Randolph A. Leising, Williamsville, both of N.Y.

[73] Assignee: Wilson Greatbatch Ltd., Clarence, N.Y.

[21] Appl. No.: 459,740

[22] Filed: Jun. 2, 1995

Related U.S. Application Data

[63] Continuation-in-part of Ser. No. 254,167, Jun. 6, 1994, Pat. No. 5,472,810, which is a continuation-in-part of Ser. No. 32,659, Mar. 17, 1993, abandoned.

[51] Int. Cl.$^6$ .................................................... H01M 6/00
[52] U.S. Cl. ...................... 29/623.1; 429/218; 429/219; 429/220; 429/122
[58] Field of Search ........................... 29/623.1; 429/218, 429/219, 220, 40, 122, 194, 196, 199, 232; 252/518

[56] References Cited

U.S. PATENT DOCUMENTS

| | | | |
|---|---|---|---|
| 3,994,746 | 11/1976 | Sakai et al. | 429/219 |
| 4,310,609 | 1/1982 | Liang et al. | 429/194 |
| 4,366,215 | 12/1982 | Coetzer et al. | 429/194 |
| 4,830,940 | 5/1989 | Keister et al. | 429/194 |

FOREIGN PATENT DOCUMENTS

| | | |
|---|---|---|
| 5916272 | 1/1982 | Japan. |
| 59-134561 | 8/1984 | Japan. |

*Primary Examiner*—Bruce F. Bell
*Attorney, Agent, or Firm*—Hodgson, Russ, Andrews, Woods & Goodyear

[57] ABSTRACT

An electrochemical cell incorporating cathode materials comprising at least one metal oxide, a first metal and a second metal or a mixture of a first and a second metals or their metal oxides incorporated in the matrix of a host metal oxide is described. The cathode materials of this invention are constructed of the chemical addition, reaction, or otherwise intimate contact of various metal oxides and/or metal elements during thermal treatment in mixed states. The materials thereby produced contain metals and oxides of Group IB, IIB, IIIB, IVB, VB, VIB, VIIB, and VIII, which include the noble metals and/or their metal oxide compounds. A preferred material comprises a metal oxide matrix material formed of vanadium oxide and a copper-containing constituent and a silver-containing constituent.

43 Claims, 5 Drawing Sheets

PROCESS FOR MAKING A METAL OXIDE COMPOSITE CATHODE MATERIAL FOR HIGH ENERGY DENSITY BATTERIES

CROSS REFERENCES TO RELATED APPLICATIONS

This application is a continuation-in-part of Ser. No. 08/254,167, now U.S. Pat. No. 5,472,810 filed Jun. 6, 1994, which is a continuation-in-part of Ser. No. 08/032,659, filed Mar. 17, 1993, now abandoned.

BACKGROUND OF THE INVENTION

1. Field of the Invention

This invention relates to the art of electrochemical cells, and more particularly, to a new and improved electrochemical cell, and cathode therefor, comprising a Group IA anode and a composite metal-metal-metal oxide cathode.

Light metals have exceptionally high energy density when employed as the anode material in electrochemical cells owing to their low atomic weight and to the high standard potential of the cells. This high chemical activity of light metal anode material requires the use of a nonaqueous electrolyte and a cathode which meets the rigorous requirements for such a cell. Most cathode materials are too readily soluble in a nonaqueous electrolyte and, thereby, reduce the useful capacity of such an electrode after storage. The cathode material of the present invention uses a mixed metal oxide containing copper, silver, and vanadium as an electrode material for application as a cathode in a lithium battery. This provides a new and distinct cathode material having the general formula $Cu_xAg_yV_2O_z$, also referred to herein as CSVO.

2. Prior Art

It is known to use metal oxides as cathode materials in nonaqueous electrochemical cells. For example, U.S. Pat. No. 4,310,609 Liang et al., which is assigned to the assignee of the present invention and incorporated herein by reference, discloses the use of a composite cathode material including $V_2O_x$ wherein $x \leq 5$ combined with one or more of $Ag_2O_x$ wherein x=0 to 1; $CuO_x$ wherein x=0 to 1; and $MnO_x$ wherein x=1 to 3. The composite material is described as a metal oxide-metal oxide, a metal-metal oxide, or a metal-metal oxide-metal oxide. A preferred embodiment of this cathode material has the formula $AgV_2O_{5.5}$, also referred to herein as SVO.

While this prior art battery material works well, the cathode material of the present invention provides an increased gravimetric energy density and an increased pulse voltage delivery capacity. This makes the cathode material of the present invention particularly useful for implantable medical applications. The CSVO material of the present invention is also an improvement over SVO cathode material in savings on the expense of the silver starting material.

SUMMARY OF THE INVENTION

This invention relates to electrochemical cells comprising an anode of a Group IA metal and a cathode of a composite material prepared by the chemical addition, reaction, or otherwise intimate contact of several metal oxides, metal or metal oxide/elemental metal combinations, preferably during thermal treatment, sol-gel formation, chemical vapor deposition or hydrothermal synthesis in mixed states.

OBJECTS OF THE INVENTION

It is an object of the present invention to provide a new and improved electrochemical cell having relatively high energy density, discharge capacity, reduced voltage delay under high rate applications, and a wide operating temperature range.

It is a further object of this invention to provide such an electrochemical cell of high reliability and utility even after prolonged storage.

It is another object of this invention to provide such an electrochemical cell having a relatively high open circuit voltage and current capacity.

It is still another object of this invention to provide an electrochemical cell having an oxidizable active anode material and a cathode material combining various metal oxides or oxide/elemental metal combinations prepared by the method of the present invention.

The foregoing and additional advantages and characterizing features of the present invention will become apparent from the following detailed description taken in conjunction with the drawings.

DETAILED DESCRIPTION OF THE INVENTION

The electrochemical cell of the present invention comprises an anode of a metal selected from Group IA of the Periodic Table of the Elements, including lithium, sodium, potassium, etc., and their alloys and intermetallic compounds including, for example, Li-Si, Li-Al, Li-B and Li-Si-B alloys and intermetallic compounds. The form of the anode may vary, but typically, it is made as a thin sheet or foil of the anode metal, and a current collector having an extended tab or lead affixed to the anode sheet or foil.

The electrochemical cell of the present invention further comprises a cathode of electronically conductive composite material which serves as the other electrode of the cell. The electrochemical reaction at the cathode involves conversion of ions which migrate from the anode to the cathode into atomic or molecular forms. The composite cathode material of the present invention comprises at least one metal oxide and at least a first and a second metals, or a mixture of a first and a second metals or their metal oxides incorporated in the matrix of the host metal oxide.

The cathode material of this invention can be constructed by the chemical addition, reaction, or otherwise intimate contact of various metal oxides and/or metal elements, preferably during thermal treatment, sol-gel formation, chemical vapor deposition or hydrothermal synthesis in mixed states. The materials thereby produced contain metals and oxides of the Groups IB, IIB, IIIB, IVB, VB, VIB, VIIB, and VIII which includes the noble metals and/or other oxide compounds.

According to one method of the present invention, readily decomposable compounds consisting of metals from Groups IB, IIB, IIIB, IVB, VB, VIB, VIIB, as well as similarly decomposable compounds from Group VIII, are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates, and/or ammonium salts. The precursor material (i.e., nitrates, nitrites, carbonates, ammonium compounds, etc.) may be decomposed in a combined state or individually decomposed and thereafter combined in an oxide/decomposable metal salt compound and subsequently decomposed to form the cathode composite matrix.

Such composite materials may be pressed into a cathode pellet with the aid of a suitable binder material such as a fluoro-resin powder, preferably polytetrafluoroethylene (PTFE) powder, and a material having electronic conductive characteristics such as graphite powder, acetylene black powder and carbon black powder. In some cases, no binder material or electronic conductor material is required to provide a similarly suitable cathode body. Further, some of the cathode matrix samples may also be prepared by rolling, spreading or pressing a mixture of the material mentioned above onto a suitable current collector. Cathodes prepared as described above may be in the form of one or more plates operatively associated with at least one or more plates of anode material, or the cathode may be in the form of a strip wound with a corresponding strip of anode material in a structure similar to a "jellyroll". The cathode is separated in both cases from the Group IA anode material by a suitable separator material.

Figure 1:
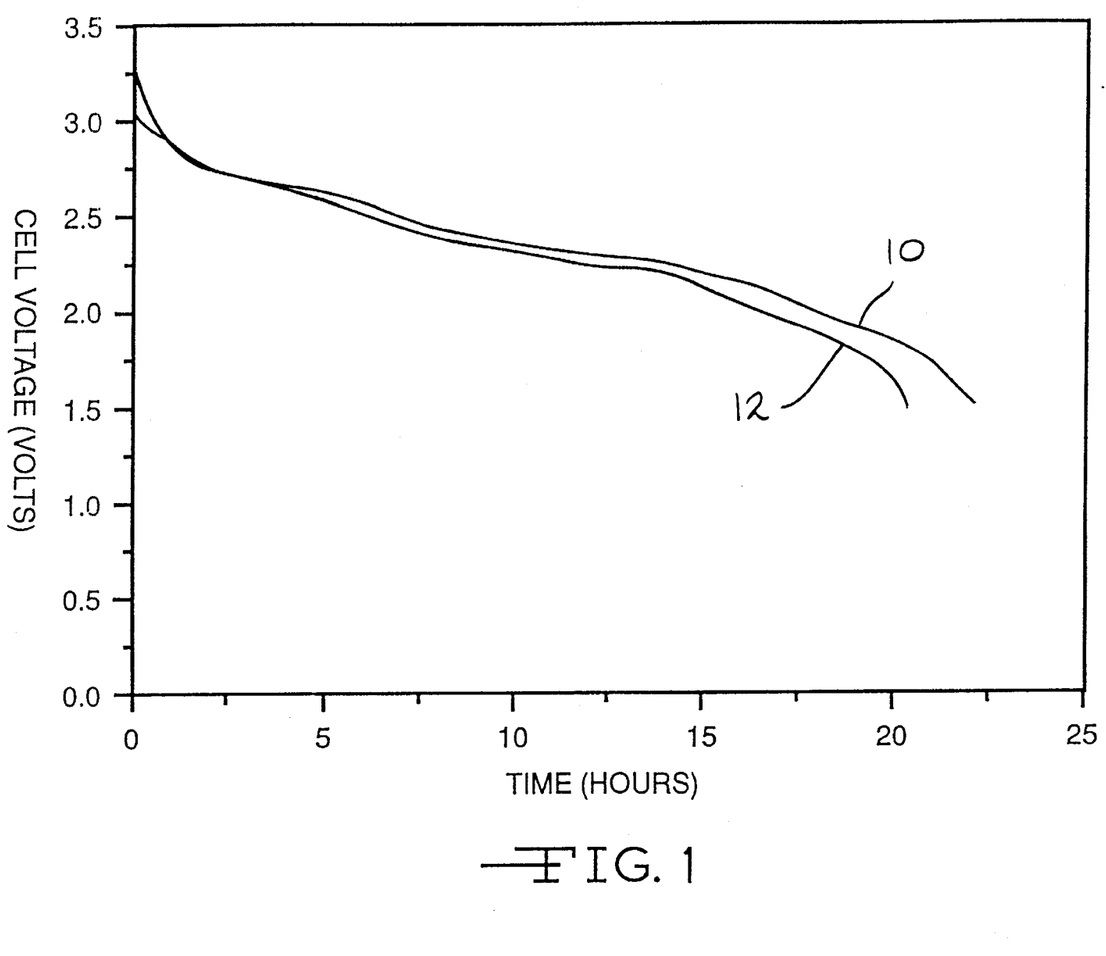
FIG. 1 is a voltage-time plot comparing a cell according to one embodiment of the present invention and a cell made according to the prior art.

Preferred cathode composites are prepared by thermally decomposing a vanadium salt, suitably ammonium metavanadate to produce vanadium pentoxide. Decomposable metal salts, suitably the nitrates of a second metal and a third metal, are then added to the vanadium pentoxide, thoroughly mixed therewith and thereafter ignited. The second and third metals are most preferably silver and copper. The resultant composite cathode includes $V_2O_z$ wherein $z \leq 5$ combined with $Ag_2O_z$ wherein $z=0$ to 1 and $CuO_z$ wherein $z=0$ to 1 to provide a new and distinct material having the formula $Cu_xAg_yV_2O_z$, (CSVO). Thus, the composite cathode material may be described as a metal oxide-metal oxide-metal oxide, a metal-metal oxide-metal oxide, or a metal-metal-metal oxide and the range of the material composition found for $Cu_xAg_yV_2O_z$ is preferably about $0.01 \leq x \leq 1.0$, about $0.01 \leq y \leq 1.0$ and about $5.01 \leq z \leq 6.5$. A typical form of CSVO is $Cu_{0.16}Ag_{0.67}V_2O_z$ with z being about 5.5. The exact stoichiometry of oxygen depends on the conditions and method used in preparation of the material. This cathode active material is characterized by a exothermic transition at 537° C. in the differential scanning calorimetry data and d-spacings of 4.36, 3.75, 3.59, 3.45 3.20, 3.08, 3.03, and 2.97 in the X-ray powder diffraction pattern for the sample. The CSVO synthesized as described above displays a bulk density of about 1.5 g/ml and displays a characteristic sloping voltage versus time curve as indicated by curve 10 in FIG. 1 for the discharge of a Li/CSVO cell, prepared as described in detail presently. The sloping discharge curve is of particular importance for batteries in implantable medical applications where a state of charge indication extrapolated from cell voltage is needed. Another typical form of CSVO is $Cu_{0.5}Ag_{0.5}V_2O_z$ with z being about 5.75.

The electrochemical cell of the present invention further comprises a nonaqueous, ionically conductive electrolytic solution of Group IA metal salt dissolved in a nonaqueous solvent and operatively associated with the anode and the cathode. The electrolytic solution serves as a medium for migration of ions between the anode and cathode during cell electrochemical reactions. Nonaqueous solvents suitable for the invention are chosen so as to exhibit those physical properties necessary for ionic transport (low viscosity, low surface tension, and wettability). The nonaqueous solvent of the electrolyte may be any one or more of the organic solvents which are substantially inert to the anode and cathode electrode materials, such as tetrahydrofuran, propylene carbonate, methyl acetate, diglyme, triglyme, tetraglyme, acetonitrile, dimethyl sulfoxide, dimethyl formamide, dimethyl acetamide, 1,2-dimethoxyethane and others.

A preferred solvent comprises a 50/50 mixture (by volume) of 1,2-dimethoxyethane and propylene carbonate (DME/PC). The nonaqueous solvent also may be one or a mixture of more than one of the inorganic solvents which can serve as both a solvent and a depolarizer, such as thionyl chloride, sulfuryl chloride, selenium oxychloride, chromyl chloride, phosphoryl chloride, phosphorous sulfur trichloride, and others. The Group IA metal salt of the nonaqueous electrolytic solution may be chosen from, for example, lithium halides, such as LiCl and LiBr, and lithium salts of the $LiMX_n$ type, such as $LiAlCl_4$, $Li_2Al_2Cl_6O$, $LiClO_4$, $LiAsF_6$, $LiPF_6$, $LiSbF_6$, $LiSbCl_6$, $Li_2TiCl_6$, $Li_2SeCl_6$, $Li_2B_{10}Cl_{10}$, $LiSO_3CF_3$, $Li_2B_{12}Cl_{12}$, and others. Alternatively, the corresponding sodium or potassium salts may be used.

When the mechanical structure or configuration of the cell requires, a separator can be employed to provide physical separation between the anode and the cathode current collectors. The separator is of electrically insulative material to prevent an internal electrical short circuit in the cell between the anode and the cathode current collectors. The separator material also must be chemically unreactive with the materials of the anode and cathode current collectors and be both chemically unreactive with and insoluble in the electrolytic solution. In addition, the separator material must have a degree of porosity sufficient to allow flow therethrough of the electrolytic solution during the electrochemical reaction of the cell. Illustrative separator materials include nonwoven glass, polypropylene, polyethylene, glass fiber material, ceramics, and polytetrafluoroethylene membrane commercially available under the designation ZITEX (Chemplast Inc.), polypropylene membrane, commercially available under the designation CELGARD (Celanese Plastic Company Inc.), and DEXIGLAS (C.H. Dexter, Div. Dexter Corp.). The form of the separator typically is a sheet which is placed between the anode and the cathode of the cell in a manner preventing physical contact between the anode and the cathode, and such contact also is prevented when the combination is rolled or otherwise formed into a cylindrical configuration having a jellyroll shape.

The electrochemical cell of the present invention operates in the following manner. When the ionically conductive electrolytic solution becomes operatively associated with the anode and the cathode of the cell, an electrical potential difference is developed between terminals operatively connected to the anode and cathode. The electrochemical reaction at the anode includes oxidation to form metal ions during discharge of the cell. The electrochemical reaction at the cathode involves conversion of ions which migrate from the anode to the cathode into atomic or molecular forms. It is observed that the systems of this invention have a wide operating temperature range of about −20° C. to +70° C. Advantages of the CSVO cathode material according to the present invention include a high delivered capacity for the intercalation of lithium and reduced voltage delay under current discharge applications, such as in batteries for implantable cardiac defibrillators, together with the cost saving resulting from the reduced amount of silver as a starting material.

The electrochemical cell according to the present invention is illustrated further by the following examples.

EXAMPLE I

Preparation of $Cu_{0.16}Ag_{0.67}V_2O_z$

Copper silver vanadium oxide (CSVO) was synthesized via a solid-state reaction of thermally decomposable salts of copper and silver with vanadium pentoxide. The oxygen content in $Cu_{0.16}Ag_{0.67}V_2O_z$ is designated by z of about 5.5 since the exact stoichiometry of oxygen depends on the conditions and method used in preparation of the material.

Commercially available ammonium vanadate, $NH_4VO_3$ (Cerac, 99.99%, −80 mesh) was thermally decomposed to vanadium pentoxide, $V_2O_5$, in an air furnace at elevated temperatures. Evidence of the complete decomposition was based upon the distinct lack of $NH_{3(g)}$ and the comparison of product yield to the theoretical yield for $V_2O_5$.

Silver nitrate, $AgNO_3$ (16.73 g, 0.098 mol) and copper(II) nitrate hydrate, $Cu(NO_3)_2 \cdot 3H_2O$ (5.68 g, 0.024 mol) were dissolved in 25 ml of deionized/distilled water. The aqueous salt solution was added to the previously prepared solid vanadium pentoxide, $V_2O_5$ (26.74 g, 0.147 mol), and the resulting slurry was heated to about 80° C. to 120° C. to evaporate all of the water. During this time, the slurry was mixed intermittently until the sample became a dry powder. This powder was ground to thoroughly mix the components. The solid was heated at about 230° C. under an air atmosphere for at least 30 minutes, and mixed again. The temperature of the oven was then increased to about 260° C. for at least 2 hours, followed by heating at about 300° C. for at least 16 hours. The material was then ground again, and heated at about 375° C. for not less than 24 hours. Upon cooling, the material was used without further preparation.

EXAMPLE II

Preparation of $Cu_{0.5}Ag_{0.5}V_2O_z$

Silver nitrate, $AgNO_3$ (16.63 g, 0.098 mol) and copper(II) nitrate hydrate, $Cu(NO_3)_2 \cdot 3H_2O$ (23.66 g, 0.098 mol) were dissolved in 30 ml of deionized/distilled water. The aqueous salt solution was added to solid vanadium pentoxide, $V_2O_5$ (35.62 g, 0.196 mol) and the material was synthesized as described in Example I.

EXAMPLE III

Preparation of $Cu_{0.16}Ag_{0.67}V_2O_z$ from metal oxides

Silver oxide, $Ag_2O$ (2.14 g, 0.009 mol) and copper(II) oxide, CuO (0.35 g, 0.004 mol) were mixed as dry powders and added to solid vanadium pentoxide, $V_2O_5$ (5.00 g, 0.028 mol). This dry powder sample was mixed well and thermally treated as described in Example I. The metal oxides may also be taken up as a slurry in an aqueous or a nonaqueous solvent, mixed thoroughly and dried as described in Example I. Additional salts may also be used for the synthesis of CSVO materials. Examples of silver and copper salts for the synthesis include, but are not limited to, classes of salts known as nitrites, acetates, and carbonates, as well as the above-mentioned nitrates and oxides. Copper materials may be used in either the copper(II), copper(I) or copper(0) oxidation state. In addition, $AgVO_3$ or other $Ag_xVO_z$ precursors may be combined with $V_2O_z$ and a salt of copper or copper metal to form the CSVO material. Likewise, a silver salt or silver metal may be combined with a $Cu_xVO_z$ precursor and $V_2O_z$ to form CSVO.

COMPARATIVE EXAMPLE I

Preparation of $AgV_2O_z$

Silver vanadium oxide (SVO, $AgV_2O_z$) made according to U.S. Pat. No. 4,310,609 to Liang et al. was synthesized to provide a comparison to the copper silver vanadium oxides from Examples I to III. Silver nitrate, $AgNO_3$ (93.4 g, 0.55 mol) was dissolved in 70 ml of deionized/distilled water. The aqueous salt solution was added to solid vanadium pentoxide, $V_2O_5$ (100.0 g, 0.55 mol), and the mixture was synthesized as described in Example I.

EXAMPLE IV

Thermal analysis of materials

Differential Scanning Calorimetry (DSC) data was obtained for CSVO samples made according to Examples I and II and SVO made according to Comparative Example I. The results of scans from about 25° C. to 600° C. are presented in TABLE I. It can be readily seen that CSVO materials display different thermal properties than the SVO material, demonstrating that CSVO is a new species, significantly different from SVO.

TABLE I

| Temperature of Thermal Transitions | | |
| --- | --- | --- |
| $Cu_{0.16}Ag_{0.67}V_2O_z$ | $Cu_{0.5}Ag_{0.5}V_2O_z$ | $AgV_2O_z$ |
| 523° C. | 542° C. | 462° C. |
| 537° C. | | 540° C. |
| 592° C. | | 553° C. |
| | | 591° C. |

EXAMPLE V

Experimental cells were used to test the ability of CSVO made according to Examples I to III to intercalate lithium under constant resistance discharge, current pulse, or a combination of these test conditions. In addition, test cells were constructed using SVO made according to Comparative Example I to compare to the CSVO materials. In each case, the cell design utilized a cathode in the form of a pellet having a length of 3.6 cm, a width of 1.4 cm, and a thickness of about 0.06 cm. The cathode consisted of a mixture of 94% of active material (CSVO or SVO) by weight along with 3% polytetrafluoroethylene, 2% graphite, and 1% carbon black. The cathode mixtures were each pressed onto an expanded metal current collector, and the respective cathodes separated from the lithium anode by a polypropylene separator.

Lithium metal (1.4×3.6×0.08 cm), also in contact with an expanded metal current collector, was placed against the separator facing the CSVO cathodes and the SVO cathodes. Both electrodes in the respective cells were surrounded by glass plates and held together by small metal clamps. The electrodes were placed in a glass enclosure and filled with a 1 molar solution of lithium hexafluoroarsenate ($LiAsF_6$) dissolved in an equal volume mixture of propylene carbonate (PC) and 1,2-dimethoxyethane (DME) as the electrolyte. The Li/CSVO test cells and the Li/SVO test cells were then capped to avoid the evaporation of the DME electrolyte.

EXAMPLE VI

Discharge of Li/CSVO compared to Li/SVO

The test cells described in Example V were discharged at room temperature under a constant 200 ohm load down to a voltage of +1.5 V vs $Li/Li^+$, corresponding to the intercalation of $Li^+$ into the cathode material. The voltage of a test cell using CSVO from Example II is plotted as a function of time during the 200 ohm discharge and indicated by curve 10 in FIG. 1. The discharge curve for this Li/CSVO test cell is compared to the voltage-time results for a Li/SVO cell indicated by curve 12 in the same figure. The cells containing CSVO cathodes displayed an increase in delivered capacity over that seen for silver vanadium oxide (SVO), as listed in Table II. The capacity values in Table II are based on the amount of active material in the cathode.

TABLE II

| Cathode Material | Capacity | |
|---|---|---|
| | to +2.0 V | to +1.5 V |
| $AgV_2O_z$ | 250 Ah/kg (610 Wh/kg) | 300 Ah/kg (690 Wh/kg) |
| $Cu_{0.16}Ag_{0.67}V_2O_z$ | 270 Ah/kg (650 Wh/kg) | 310 Ah/kg (710 Wh/kg) |
| $Cu_{0.5}Ag_{0.5}V_2O_z$ | 280 Ah/kg (680 Wh/kg) | 330 Ah/kg (760 Wh/kg) |

Pulse testing (0.19 Amp) of experimental cells at room temperature using CSVO from Examples I and II also demonstrated substantially decreased voltage delay when compared to cells employing SVO from Comparative Example I.

COMPARATIVE EXAMPLE II

Comparative test cells were constructed using CSVO having the stoichiometric proportion between x and y in the general formula $Cu_xAg_yV_2O_z$ such that x was greater than y. These comparative cells were then discharged under a similar regime as set forth in Example VI and the results are presented in Table III.

TABLE III

| Cathode Material | Capacity | |
|---|---|---|
| | to +2.0 V | to +1.5 V |
| $Cu_{2.0}Ag_{0.67}V_2O_z$ | 240 Ah/kg (563 Wh/kg) | 296 Ah/kg(653 Wh/kg) |
| $Cu_{0.42}Ag_{0.16}V_2O_z$ | 214 Ah/kg (530 Wh/kg) | 292 Ah/kg(650 Wh/kg) |

Figure 2:
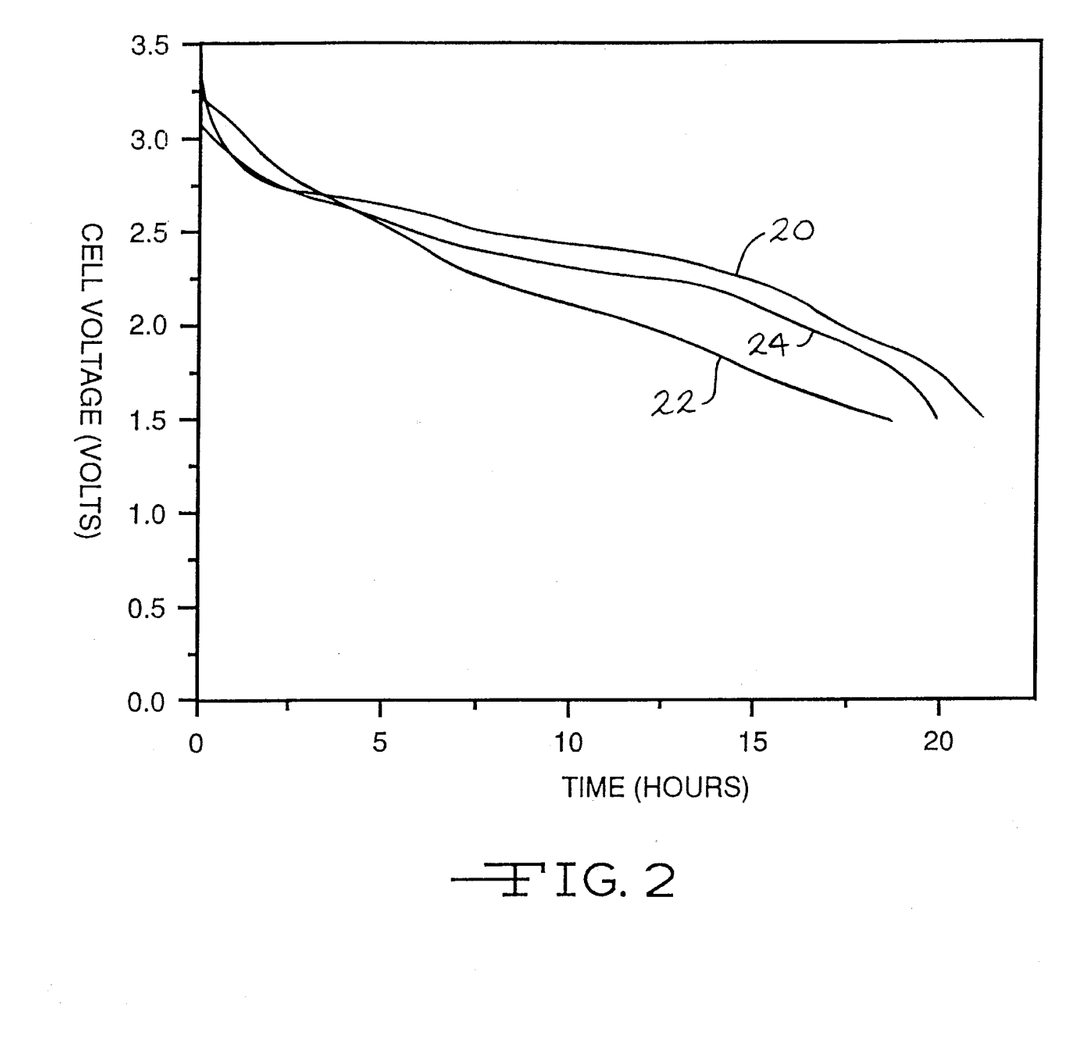
FIG. 2 is a voltage-time plot comparing cells having a cathode comprising $Cu_xAg_yV_2O_z$ made according to the present invention with the stoichiometric proportion between x and y such that y was greater than x.

The voltage-time results of a test cell using the $Cu_{0.5}Ag_{0.5}V_2O_z$ cathode material from Example VI is presented in FIG. 2 and indicated as curve 20. The voltage-time results for a similarly constructed comparative test cell using $Cu_{0.42}Ag_{0.16}V_2O_z$ cathode material, i.e., having x greater than y in the general formula is also presented in FIG. 2 and indicated as curve 22. Further a lithium cell having a cathode comprising silver vanadium oxide (SVO) made according to Comparative Example I was discharged under similar conditions as the other cells in this example and the voltage-time results are indicated as curve 24 in FIG. 2.

The results of these tests clearly demonstrate the improved energy capacity of a composite oxide matrix material made from the claimed metal oxide and metal materials and having the preferred stoichiometric range, namely $x \leq y$ in the formula $CU_xAg_yV_2O_z$.

COMPARATIVE EXAMPLE III

An experiment was carried out to compare the discharge of CSVO materials, $Cu_{0.5}Ag_{0.5}V_2O_z$ with z being about 5.75 and $Cu_{0.16}Ag_{0.67}V_2O_z$ with z being about 5.5, with simple mixtures of metal oxides containing the same ratios of copper, silver, and vanadium. The CSVO materials were prepared as described in Examples I to III. To prepare the metal oxide mixtures, silver vanadium oxides and copper vanadium oxides were mixed at about 25° C. with the appropriate amount of CuO or $Ag_2O$ to give a material containing the same ratio of copper, silver and vanadium as the CSVO material. Thus, the mixtures of metal oxides had the same elemental composition as the CSVO materials, but in contrast to the CSVO materials, were not thermally treated. Table IV lists the materials used in the preparation of these samples.

TABLE IV

| Metal Oxide #1 | Metal Oxide #2 | Target CSVO Composition |
|---|---|---|
| $Ag_{0.5}V_2O_{5.25}$ | 0.5 eq. CuO | $Cu_{0.5}Ag_{0.5}V_2O_{5.75}$ |
| $Cu_{0.5}V_2O_{5.5}$ | 0.25 eq. $Ag_2O$ | $Cu_{0.5}Ag_{0.5}V_2O_{5.75}$ |
| $Ag_{0.67}V_2O_{5.3}$ | 0.16 eq. CuO | $Cu_{0.16}Ag_{0.67}V_2O_{5.5}$ |
| $Cu_{0.16}V_2O_{5.2}$ | 0.67 eq. $Ag_2O$ | $Cu_{0.16}Ag_{0.67}V_2O_{5.5}$ |

Figure 3:
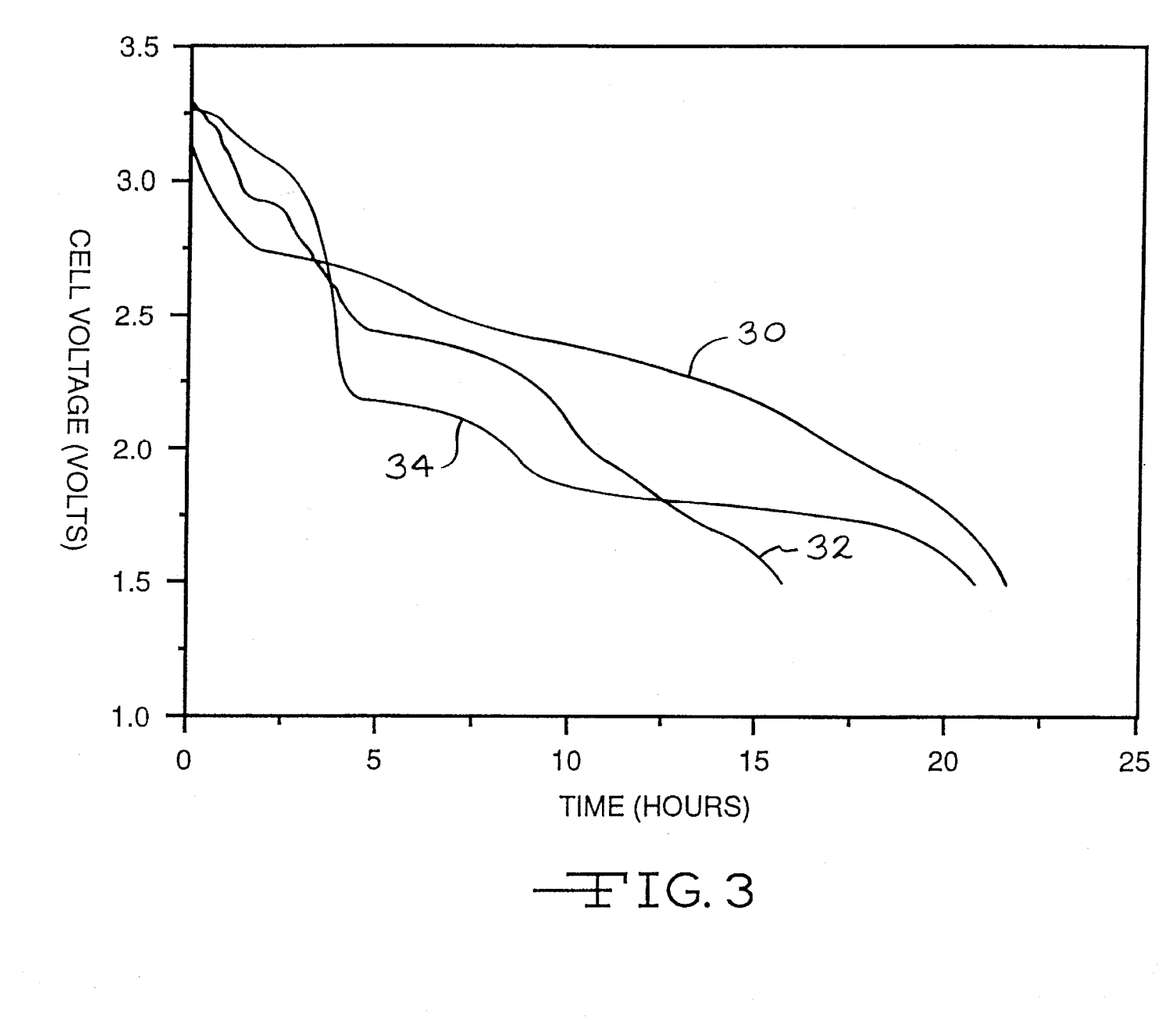
FIGS. 3 and 4 are voltage-time plots comparing a cell having a cathode comprising CSVO made according to the present invention with cells having a cathode comprising simple mixtures of metal oxides containing the same ratios of copper, silver and vanadium as CSVO but without the various starting constituents having undergone thermal treatment.
Figure 4:
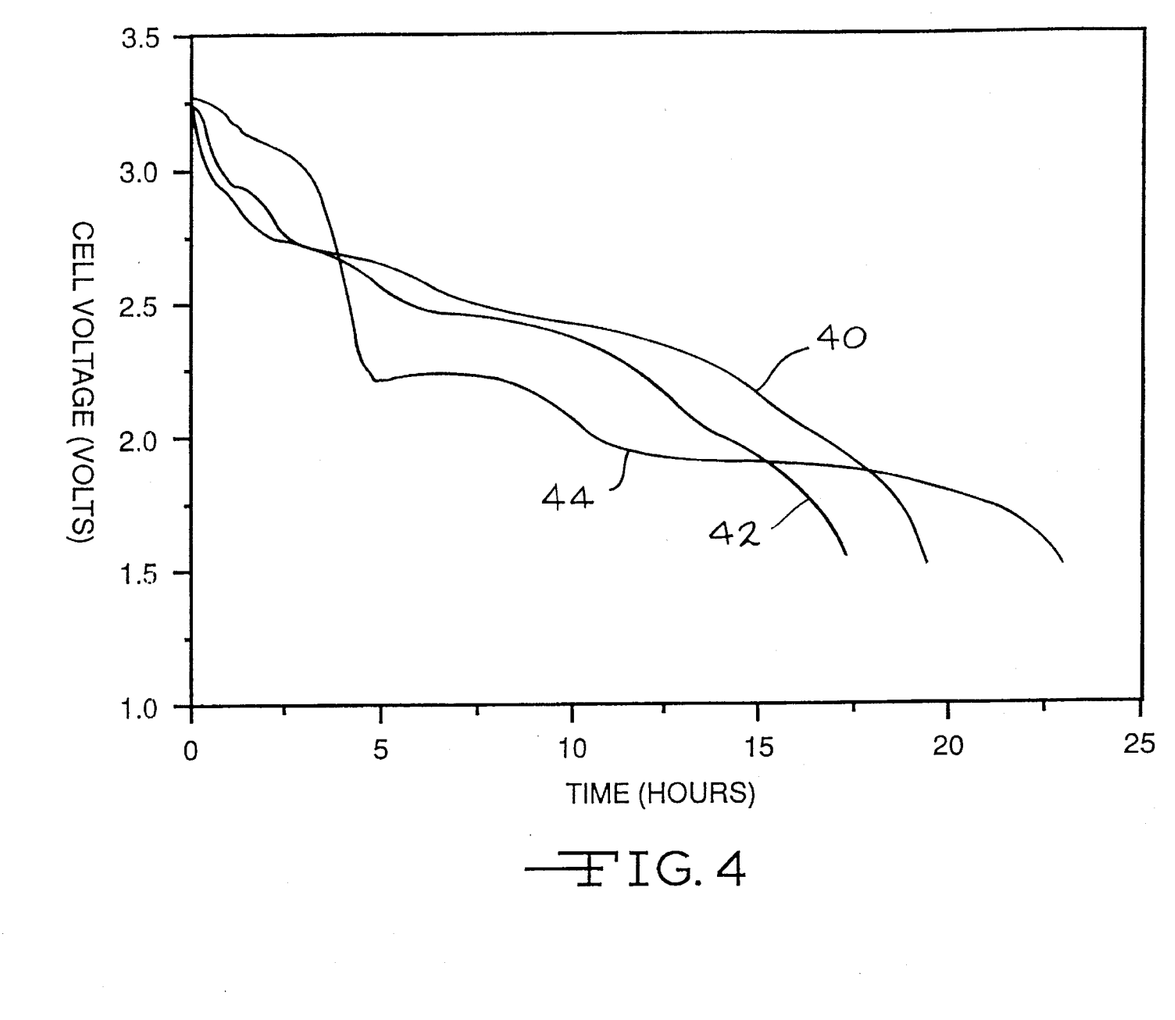

These materials were each incorporated into pressed pellet cathodes and used in test cells with lithium metal anodes and 1M $LiAsF_6$ (50:50) PC/DME electrolyte. The cells were discharged at room temperature under a constant 200Ω load down to a voltage of +1.5 V vs Li/Li+. The experimental capacities and energy densities for these cathode materials are summarized in Table V based on the weight and volume of the respective cathodes. In addition, the voltage vs time plots for these discharge reactions are given in FIGS. 3 and 4. Thus, curve 30 in FIG. 3 indicates the discharge curve as a function of time of a test cell having a CSVO cathode made according to Example II. Curve 32 indicates the discharge-time curve of a test cell having a cathode comprising silver vanadium oxide mixed with copper oxide in a similar proportion as the CSVO material indicated by curve 30, however, the constituents were not combined in a thermal treatment step. Similarly, curve 34 indicates the discharge-time curve of a test cell having a cathode comprising copper vanadium oxide mixed with silver oxide in a similar proportion as the CSVO material indicated by curve 30, but without being combined through thermal treatment. In FIG. 4, copper silver vanadium oxide cathode material having the stoichiometric formula $Cu_{0.16}Ag_{0.67}V_2O_{5.5}$ was incorporated into a lithium cell and the discharge-time curve is indicated as curve 40 in FIG. 4. Curve 42 in FIG. 4 indicates the discharge-time results of a test cell having a cathode comprising silver vanadium oxide mixed with copper oxide in a similar proportion as the CSVO material indicated by curve 40, but without the constituents being combined in a thermal treatment step. Similarly, curve 44 indicates the discharge-time curve of a test cell having a cathode comprising copper vanadium oxide mixed with silver oxide in a similar proportion as the CSVO material indicated by curve 40, but without being combined through thermal treatment.

TABLE V

| Sample | Capacity (Energy Density) | | | | | | | |
|---|---|---|---|---|---|---|---|---|
| | To +2.0V | | To +1.5V | | To +2.0V | | To +1.5V | |
| | Ah/kg | (Wh/kg) | Ah/kg | (Wh/kg) | Ah/L | (Wh/L) | Ah/L | (Wh/L) |
| $Cu_{0.5}Ag_{0.5}V_2O_{5.75}$ (CSVO) | 275 | 675 | 332 | 774 | 742 | 1822 | 894 | 2083 |
| $Ag_{0.5}V_2O_{5.25} + 0.5CuO$ | 180 | 461 | 240 | 552 | 362 | 926 | 482 | 1109 |
| $Cu_{0.5}V_2O_{5.5} + 0.25Ag_2O$ | 143 | 367 | 287 | 603 | 350 | 896 | 699 | 1465 |
| $Cu_{0.16}Ag_{0.67}V_2O_{5.5}$ (CSVO) | 270 | 650 | 310 | 710 | 728 | 1754 | 836 | 1916 |
| $Ag_{0.67}V_2O_{5.3} + 0.16CuO$ | 225 | 566 | 269 | 636 | 602 | 1513 | 720 | 1700 |
| $Cu_{0.16}V_2O_{5.2} + 0.33Ag_2O$ | 169 | 627 | 316 | 678 | 350 | 885 | 656 | 1405 |

From the discharge capacities and voltage profiles it is apparent that the CSVO materials of the present invention provide much higher discharge capacity than simple mixtures of metal oxides of the same elemental composition. In particular, the volumetric energy densities of these materials are much higher than for the mixtures of the metal oxides.

EXAMPLE VII

Preparation and testing of multi-plate batteries

Figure 5:
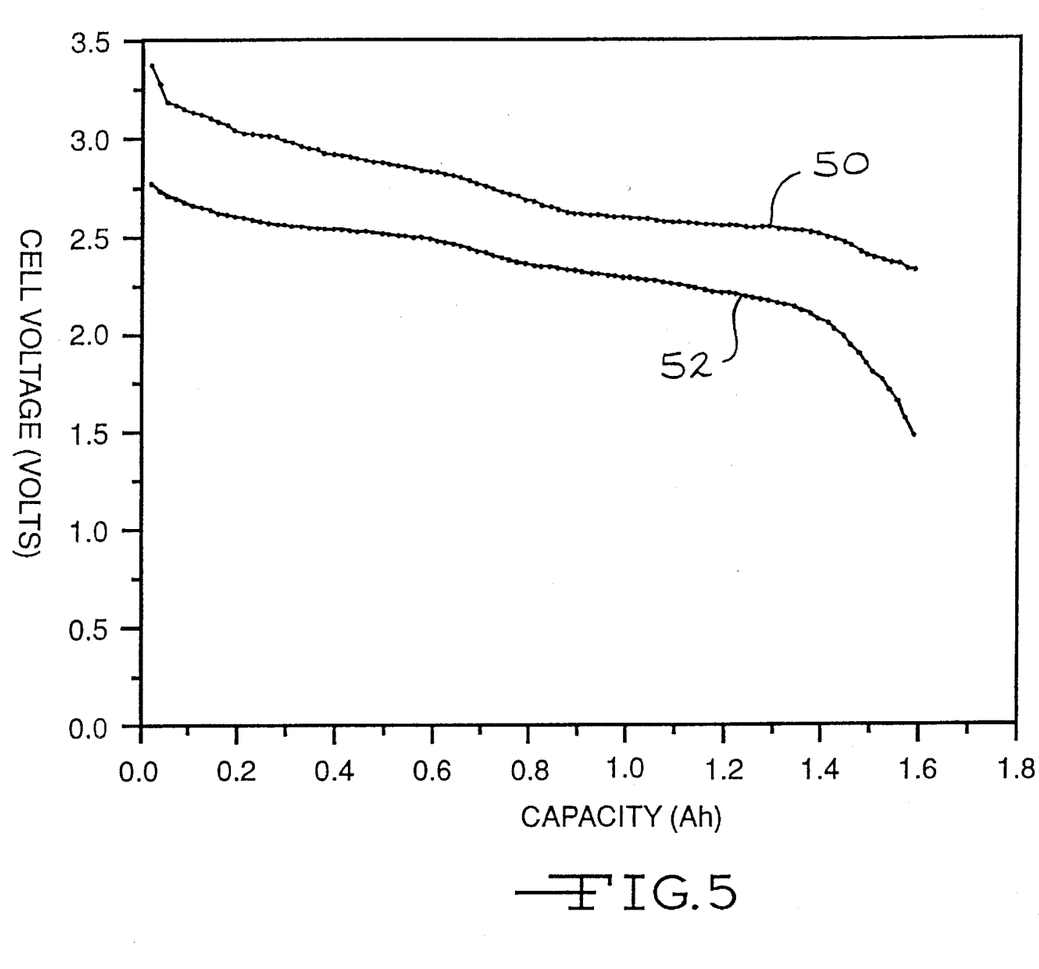
FIG. 5 is a voltage-cumulative capacity plot for a cell having a cathode comprising CSVO according to one embodiment of the present invention showing open circuit voltage and minimum pulse voltage.

Multi-plate batteries containing cathodes similar in construction to those described in Example V were built using CSVO from Examples I and II and SVO from Comparative Example I. These batteries contained lithium anodes, 1M LiAsF$_6$ PC/DME (50/50) electrolyte, and were hermetically sealed. These cells were discharged via constant current pulse testing at about 37° C. Current pulses of 1.5 Amps were applied for 10 seconds in duration followed by 15 seconds of open circuit rest between pulses. These pulses were applied in groups of four, with 30 minutes of open circuit rest between groups. The results of the pulse testing are presented in Table VI. Additionally, the plotted open circuit voltage is indicated as curve 50 in FIG. 5 and the minimum voltage for the fourth pulse of each group is indicated by curve 52 in this figure for a Li/CSVO multiplate battery containing $Cu_{0.16}Ag_{0.67}V_2O_z$.

TABLE VI

| | Capacity | |
|---|---|---|
| Cathode Material | to +2.0 V | to +1.5 V |
| $AgV_2O_z$ | 1436 mAh | 1704 mAh |
| $Cu_{0.16}Ag_{0.67}V_2O_z$ | 1471 mAh | 1726 mAh |
| $Cu_{0.5}Ag_{0.5}V_2O_z$ | 1545 mAh | 1784 mAh |

EXAMPLE VIII

An experiment was carried out to compare the discharge of CSVO materials prepared using a series of synthesis temperatures, ranging from 300° C. to 600°. The CSVO materials, $Cu_{0.5}Ag_{0.5}V_2O_z$, were prepared as described in Examples I to III, except that the final step in the synthesis utilized a temperature of 300° C., 350° C., 375° C., 400° C., 450° C., 500° C., or 600° C. The CSVO samples were prepared from metal nitrate starting materials. The final products were tested in electrochemical cells at room temperature under a constant 200 ohm load, as described in Examples V and Vi. The results of these test are summarized in Table VII. As can be seen in Table VII, the final synthesis temperature of 375° C. provides a material with the highest capacity to a +2.0 V cutoff voltage, making this the optimum material.

TABLE VII

| Final Synthesis Temperature | Capacity | |
|---|---|---|
| | to +2.0 V | to +1.5 V |
| 300° C. | 285 Ah/kg | 348 Ah/kg |
| 350° C. | 279 Ah/kg | 342 Ah/kg |
| 375° C. | 290 Ah/kg | 327 Ah/kg |
| 400° C. | 275 Ah/kg | 310 Ah/kg |
| 450° C. | 277 Ah/kg | 312 Ah/kg |
| 500° C. | 261 Ah/kg | 296 Ah/kg |
| 600° C. | 223 Ah/kg | 267 Ah/kg |

The above detailed description and examples are intended for purposes of illustrating the invention and are not to be construed as limiting.

What is claimed is:

1. A method for making a cathode for an electrochemical cell, the cathode comprising a metal oxide matrix material, which method comprises:

a) combining vanadium oxide with a mixture of a copper-containing constituent and a silver-containing constituent to provide a metal oxide matrix admixture;

b) reacting the metal oxide matrix admixture in either a thermal decomposition reaction or a thermal addition reaction to provide the metal oxide matrix material having a stoichiometric formulation consisting of either $Cu_{0.16}Ag_{0.67}V_2O_z$ with z being about 5.5 or $Cu_{0.5}Ag_{0.5}V_2O_z$ with z being about 5.75; and c) forming the metal oxide matrix material into the cathode.

2. The method of claim 1 including selecting the silver-containing constituent from the groups consisting of silver, silver nitrate, silver nitrite, silver carbonate, and salts of oxyanions, and mixtures thereof.

3. The method of claim 1 including providing one component of the metal oxide matrix admixture comprising $V_2O_z$ with $0 < z \leq 5$.

4. The method of claim 1 including providing the silver-containing constituent comprising $Ag_2O_z$ with z ranging from between about 0 to 1.

5. The method of claim 1 including providing the copper-containing constituent comprising $CuO_z$ with z ranging from between about 0 to 1.

6. The method of claim 1 including providing the metal oxide matrix material comprising a mixture of $V_2O_z$ with $0<z<5$, $Ag_2O_z$ with z ranging from between about 0 to 1 and $CuO_z$ with z ranging from between about 0 to 1, prepared by the thermal treatment of vanadium pentoxide, silver nitrate and copper nitrate, respectively.

7. The method of claim 1 including reacting the metal oxide matrix admixture at a temperature of about 375° C.

8. The method of claim 1 wherein reacting the metal oxide matrix admixture includes thermally treating, sol-gel forming, chemical vapor depositing and hydrothermally synthesizing vanadium oxide and the mixture of the copper-containing constituent and the silver-containing constituent.

9. The method of claim 1 including combining a binder material with the metal oxide matrix material formed into the cathode.

10. The method of claim 9 providing the binder material as a fluoro-resin powder.

11. The method of claim 1 including combining a conductive additive material with the metal oxide matrix material formed into the cathode.

12. The method of claim 1 including providing the conductive additive material selected from the group consisting of carbon, acetylene black and graphite, and a combination thereof.

13. The method of claim 1 wherein the metal oxide matrix material having the stoichiometric formulation $Cu_{0.16}Ag_{0.67}V_2O_z$ with z being about 5.5 is characterized by an exothermic transition in differential scanning calorimity data at 523° C., 537° C. and 592° C.

14. The method of claim 1 wherein the metal oxide matrix material having the stoichiometric formulation $Cu_{0.5}Ag_{0.5}V_2O_z$ with z being about 5.75 is characterized by an exothermic transition in differential scanning calorimity data at 542° C.

15. A method for making a cathode for an electrochemical cell, the cathode comprising a metal oxide matrix material, which method comprises:
   a) admixing vanadium oxide with a mixture of a copper-containing constituent and a silver-containing constituent to provide a metal oxide matrix admixture;
   b) combining the metal oxide matrix admixture to provide the metal oxide matrix material having a stoichiometric formulation consisting of either $Cu_{0.16}Ag_{0.67}V_2O_z$ with z being about 5.5 or $Cu_{0.5}Ag_{0.5}V_2O_z$ with z being about 5.75; and
   c) forming the metal oxide matrix material into the cathode.

16. The method of claim 15 including combining the metal oxide matrix admixture using a thermal decomposition reaction or a thermal addition reaction providing the metal oxide matrix material.

17. The method of claim 15 including selecting the silver-containing constituent from the groups consisting of silver, silver nitrate, silver nitrite, silver carbonate, and salts of oxyanions, and mixtures thereof.

18. The method of claim 15 including providing one component of the metal oxide matrix admixture comprising $V_2O_z$ with $0<z\leq5$.

19. The method of claim 15 including providing the silver-containing constituent comprising $Ag_2O_z$ with z ranging from between about 0 to 1.

20. The method of claim 15 including providing the copper-containing constituent comprising $CuO_z$ with z ranging from between about 0 to 1.

21. The method of claim 15 including providing the metal oxide matrix material comprising a mixture of $V_2O_z$ with $0<z<5$, $Ag_2O_z$ with z ranging from between about 0 to 1 and $CuO_z$ with z ranging from between about 0 to 1, prepared by the thermal treatment of vanadium pentoxide, silver nitrate and copper nitrate, respectively.

22. The method of claim 15 including reacting the metal oxide matrix admixture at a temperature of about 375° C.

23. The method of claim 15 wherein reacting the metal oxide matrix admixture includes thermally treating, sol-gel forming, chemical vapor depositing and hydrothermally synthesizing vanadium oxide and the mixture of the copper-containing constituent and the silver-containing constituent.

24. The method of claim 15 including combining a binder material with the metal oxide matrix material formed into the cathode.

25. The method of claim 15 providing the binder material as a fluoro-resin powder.

26. The method of claim 15 including combining a conductive additive material with the metal oxide matrix material formed into the cathode.

27. The method of claim 15 including providing the conductive additive material selected from the group consisting of carbon, acetylene black and graphite, and a combination thereof.

28. The method of claim 15 wherein the metal oxide matrix material having the stoichiometric formulation $Cu_{0.16}Ag_{0.67}V_2O_z$ with z being about 5.5 is characterized by an exothermic transition in differential scanning calorimity data at 523° C., 537° C. and 592° C.

29. The method of claim 15 wherein the metal oxide matrix material having the stoichiometric formulation $Cu_{0.5}Ag_{0.5}V_2O_z$ with z being about 5.75 is characterized by an exothermic transition in differential scanning calorimity data at 542° C.

30. A method for making a cathode for an electrochemical cell, the cathode comprising a metal oxide matrix material, which method comprises:
   a) combining vanadium oxide with a mixture of a copper-containing constituent and a silver-containing constituent to provide a metal oxide matrix admixture;
   b) heating the admixture without causing the admixture to decompose, the resulting metal oxide matrix material having a stoichiometric formulation consisting of either $Cu_{0.16}Ag_{0.67}V_2O_z$ with z being about 5.5 or $Cu_{0.5}Ag_{0.5}V_2O_z$ with z being about 5.75; and
   c) forming the metal oxide matrix material into the cathode.

31. The method of claim 30 including selecting the silver-containing constituent from the groups consisting of silver, silver nitrate, silver nitrite, silver carbonate, and salts of oxyanions, and mixtures thereof.

32. The method of claim 30 including providing one component of the metal oxide matrix admixture comprising $V_2O_z$ with $0<z\leq5$.

33. The method of claim 30 including providing the silver-containing constituent comprising $Ag_2O_z$ with z ranging from between about 0 to 1.

34. The method of claim 30 including providing the copper-containing constituent comprising $CuO_z$ with z ranging from between about 0 to 1.

35. The method of claim 30 including providing the metal oxide matrix material comprising a mixture of $V_2O_z$ with $0<z<5$, $Ag_2O_z$ with z ranging from between about 0 to 1 and $CuO_z$ with z ranging from between about 0 to 1, prepared by the thermal treatment of vanadium pentoxide, silver nitrate and copper nitrate, respectively.

36. The method of claim 30 including reacting the metal oxide matrix admixture at a temperatures of about 375° C.

37. The method of claim 30 wherein reacting the metal oxide matrix admixture includes thermally treating, sol-gel forming, chemical vapor depositing and hydrothermally synthesizing vanadium oxide and the mixture of the copper-containing constituent and the silver-containing constituent.

38. The method of claim 30 including combining a binder material with the metal oxide matrix material formed into the cathode.

39. The method of claim 30 providing the binder material as a fluoro-resin powder.

40. The method of claim 30 including combining a conductive additive material with the metal oxide matrix material formed into the cathode.

41. The method of claim 30 including providing the conductive additive material selected from the group consisting of carbon acetylene black and graphite, and a combination thereof.

42. The method of claim 30 wherein the metal oxide matrix material having the stoichiometric formulation $Cu_{0.16}Ag_{0.67}V_2O_z$ with z being about 5.5 is characterized by an exothermic transition in differential scanning calorimity data at 523° C., 537° C. and 592° C.

43. The method of claim 30 wherein the metal oxide matrix material having the stoichiometric formulation $Cu_{0.5}Ag_{0.5}V_2O_z$ with z being about 5.75 is characterized by an exothermic transition in differential scanning calorimity data at 542° C.

* * * * *